(12) United States Patent
Rill

(10) Patent No.: US 7,494,180 B2
(45) Date of Patent: Feb. 24, 2009

(54) MOTOR VEHICLE HAVING A SIDE SILL

(75) Inventor: Roland Rill, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/892,659

(22) Filed: Aug. 24, 2007

(65) Prior Publication Data

US 2008/0036244 A1    Feb. 14, 2008

Related U.S. Application Data

(63) Continuation of application No. PCT/EP2006/001261, filed on Feb. 11, 2006.

(30) Foreign Application Priority Data

Feb. 25, 2005    (DE) .................... 10 2005 009 162

(51) Int. Cl.
*B60J 7/00* (2006.01)
(52) U.S. Cl. ................... 296/209; 296/203.03
(58) Field of Classification Search ........... 296/193.05, 296/199, 203.01, 203.03, 204, 209
See application file for complete search history.

(56) References Cited

U.S. PATENT DOCUMENTS

| 2,597,837 | A | * | 5/1952 | Lindsay .................... 296/181.4 |
| 4,493,506 | A | * | 1/1985 | Alexander ................... 296/209 |
| 4,911,495 | A | * | 3/1990 | Haga et al. .................. 296/209 |
| 5,002,333 | A | | 3/1991 | Kenmochi et al. |
| 5,443,297 | A | * | 8/1995 | Tanaka et al. .......... 296/203.03 |
| 6,073,992 | A | | 6/2000 | Yamauchi et al. |
| 6,315,353 | B1 | | 11/2001 | Brodt et al. |
| 6,325,450 | B2 | | 12/2001 | Sakyo et al. |

(Continued)

FOREIGN PATENT DOCUMENTS

DE    934515 B    10/1955

(Continued)

OTHER PUBLICATIONS

German Search Report dated Mar. 27, 2007 with an English translation of the pertinent portions (Nine (9) pages).

(Continued)

*Primary Examiner*—Joseph D Pape
(74) *Attorney, Agent, or Firm*—Crowell & Moring LLP

(57) ABSTRACT

A side wall formed in one piece with an outer shell of a side sill from high-strength sheet steel is described. The side wall merges without gradation into the adjoining side sill in the region of at least one vehicle pillar, so that the sheet steel is subjected to significantly less strain. A side sill of shell construction for a motor vehicle is partially formed by a side wall which may be composed of high-strength sheet steel. The side sill includes, in one case, at least one inner shell and an outer shell which are connected to one another by upper and a lower flanges. The outer shell is formed by the lower section of a side wall to which an outer panel is attached for providing a downward extension, so that the inner shell and the outer panel are connected to one another in the lower flange, and the inner shell and the side wall are connected to one another in the upper flange.

18 Claims, 2 Drawing Sheets

U.S. PATENT DOCUMENTS

| | | | |
|---|---|---|---|
| 6,354,656 B1 * | 3/2002 | Hwang | 296/209 |
| 6,854,795 B2 | 2/2005 | Yamazaki et al. | |
| 7,264,302 B2 * | 9/2007 | Nagashima | 296/187.12 |
| 7,325,867 B2 * | 2/2008 | Gade et al. | 296/209 |

FOREIGN PATENT DOCUMENTS

| | | |
|---|---|---|
| DE | 100 03 878 A1 | 8/2001 |
| DE | 101 28 989 A1 | 1/2003 |
| DE | 103 16 056 A1 | 10/2003 |
| EP | 0 856 455 A2 | 8/1998 |
| EP | 0 919 454 A2 | 6/1999 |
| EP | 1 170 198 A2 | 1/2002 |
| JP | 2000-219153 A | 8/2000 |

OTHER PUBLICATIONS

International Search Report dated Apr. 13, 2006 (Three (3) pages).
Corresponding English Translation of the Written Opinion of the International Searching Authority (Form PCT/ISA/237), along with Form PCT/IB/338 and Form PCT/IB/373 (Seven (7) pages).

* cited by examiner

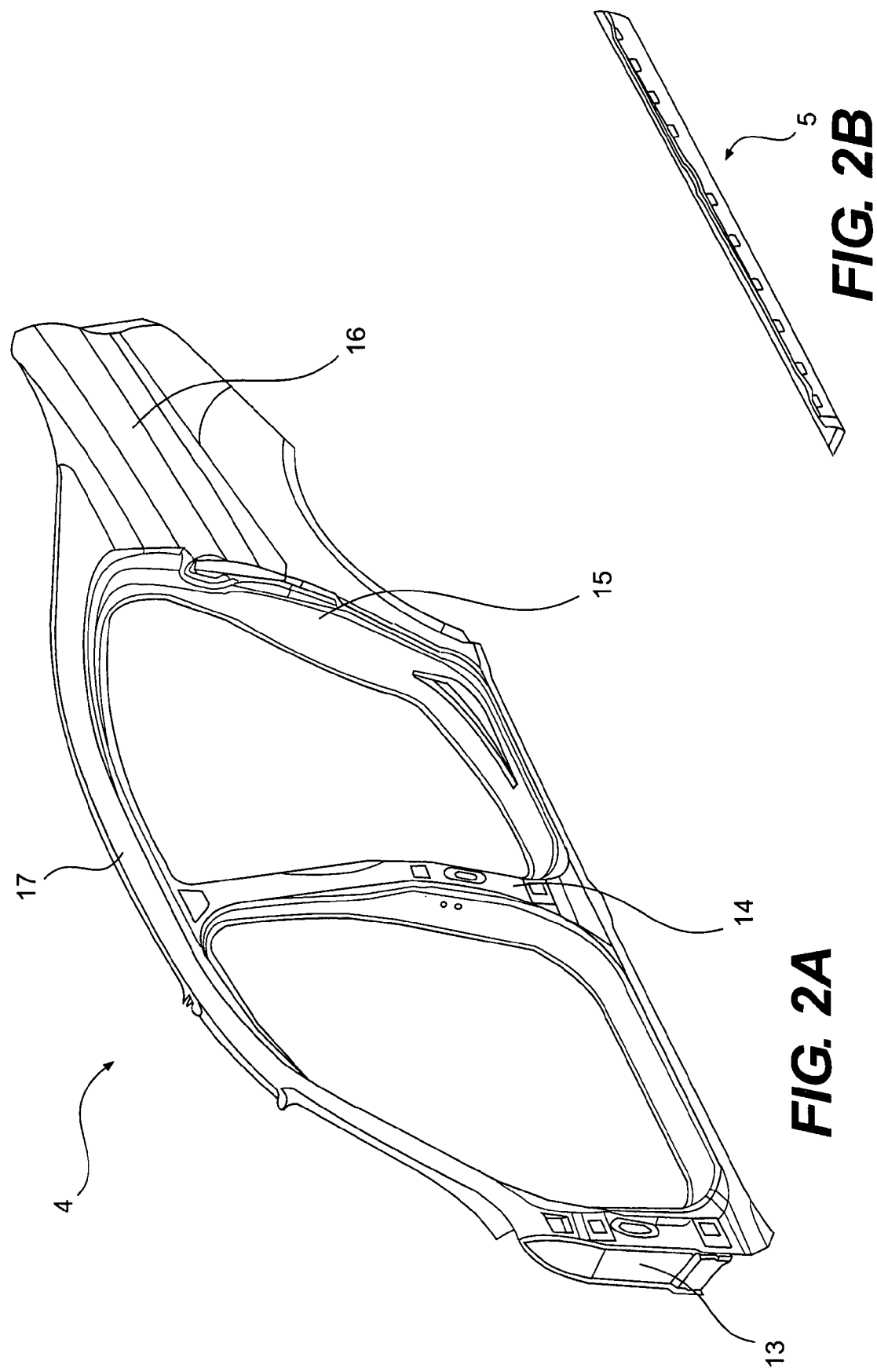

MOTOR VEHICLE HAVING A SIDE SILL

CROSS REFERENCE TO RELATED APPLICATIONS

This application is a continuation of PCT International Application No. PCT/EP2006/001261, filed Feb. 11, 2006, which claims priority under 35 U.S.C. § 119 to German Patent Application No. 10 2005 009 162.8, filed Feb. 25, 2005, the entire disclosures of which are herein expressly incorporated by reference.

BACKGROUND AND SUMMARY OF THE INVENTION

The invention relates to a motor vehicle having a side sill made of sheet metal, having an inner shell connected to an outer shell by upper and lower flanges.

Use of an inner shell and an outer shell to construct a side sill of a motor vehicle according to shell construction is generally known. For cost reasons the outer shell is frequently designed as one piece with a side wall of the motor vehicle. The side wall typically extends from the side sill to the roof side frame, and at least over the entire side door aperture of the motor vehicle.

In recent times, use of high-strength sheet steel has become more prevalent in body construction for the purpose of reducing weight and increasing rigidity. However, high-strength sheet steel permits only slightly more shaping than conventional sheet steel before reaching its yield point. During deep-drawing of high-strength sheet steel, the yield point is reached at comparatively small shaping paths. High-strength sheet steel tears when shaping is performed beyond the yield point. For this reason, until recently it was not possible to manufacture side walls having an integrated outer shell of the side sill from high-strength sheet steel, since the permissible shaping paths are too small.

A method is known from German Patent Document DE 101 28 989 A1 for forming a side wall as one piece with an outer shell of a side sill from high-strength sheet steel. In this case, the side wall merges without gradation into the adjoining side sill in the region of at least one vehicle pillar. As a result of the gradation being omitted, and therefore as a result of the lack of unrestricted overstrain of the sheet steel during the drawing process, the sheet steel is subjected to significantly less strain. Therefore, sheet steel having a higher yield point may be used.

The exemplary embodiments of the invention describe methods and systems to produce a motor vehicle having a side sill of shell construction which is partially formed by a side wall which may be composed of high-strength sheet steel.

According to an embodiment of the invention, a motor vehicle has a side sill of sheet metal shell construction having at least one inner shell and one outer shell which are connected to one another by an upper and a lower flange. The exemplary outer shell may be formed by the lower section of a side wall to which an outer panel is attached for providing a downward extension, so that the inner shell and the outer panel are connected to one another in the lower flange. The inner shell and the side wall thus are connected to one another in the upper flange.

The drawing depth required for a side wall having an integrated outer shell of a side sill is determined primarily by the width of the side sill. As a result of the division of the outer shell of the side sill on the side wall and a separate outer panel, only very small drawing depths are necessary for the side wall, regardless of the shape and width of the side sill. The shape and width of the side sill essentially affect only the shape and drawing depth of the outer panel. For this reason, the exemplary side wall may have small drawing depths of less than 85 mm, independent of the design of the side sill. This allows the use of sheet steel of high material quality for the side wall, having an Rp02 yield point of, for example, about 160 MPa or greater. On account of the smaller draw depth, the manufacture of the side wall is simplified to the extent that even the panel thickness of the side wall may be reduced. Thus, for example, panel thicknesses of about 0.7 mm and less may be achieved. The material quality and thickness of the outer panel may be functionally designed independently of the side wall. On the whole, the division of the outer shell of the side sill on the side wall and the separate outer panel afford greater design flexibility. Thus, the width of the side sill is no longer limited by manufacturability concerns, and the side sill may have localized drawn-in areas.

The side wall and the outer panel, according to an embodiment of the invention, preferably form an overlap region in the form of a connecting flange. Multiple spot welding connections are particularly suited for joining the side wall to the outer panel.

The side sill may be advantageously cladded with a panel on the visible vehicle exterior. For this reason the outer panel need not have attractive visible surfaces of appropriate surface quality. In addition, the connecting flange between the side wall and the outer panel is no longer visible, and is protected from the effects of dirt and water spray. The panel may be designed as a plastic component, for example.

Other objects, advantages and novel features of the present invention will become apparent from the following detailed description of the invention when considered in conjunction with the accompanying drawings.

BRIEF DESCRIPTION OF THE DRAWINGS

One exemplary embodiment of the invention is illustrated in the drawings, with reference to which the invention is described in greater detail below. The individual figures show schematic illustrations as follows:

FIG. 2 shows a perspective view of a side wall of the motor vehicle body and an outer panel, which in the lower region may be attached to the side wall, according to an embodiment of the invention.

DETAILED DESCRIPTION OF THE DRAWINGS

Figure 1:
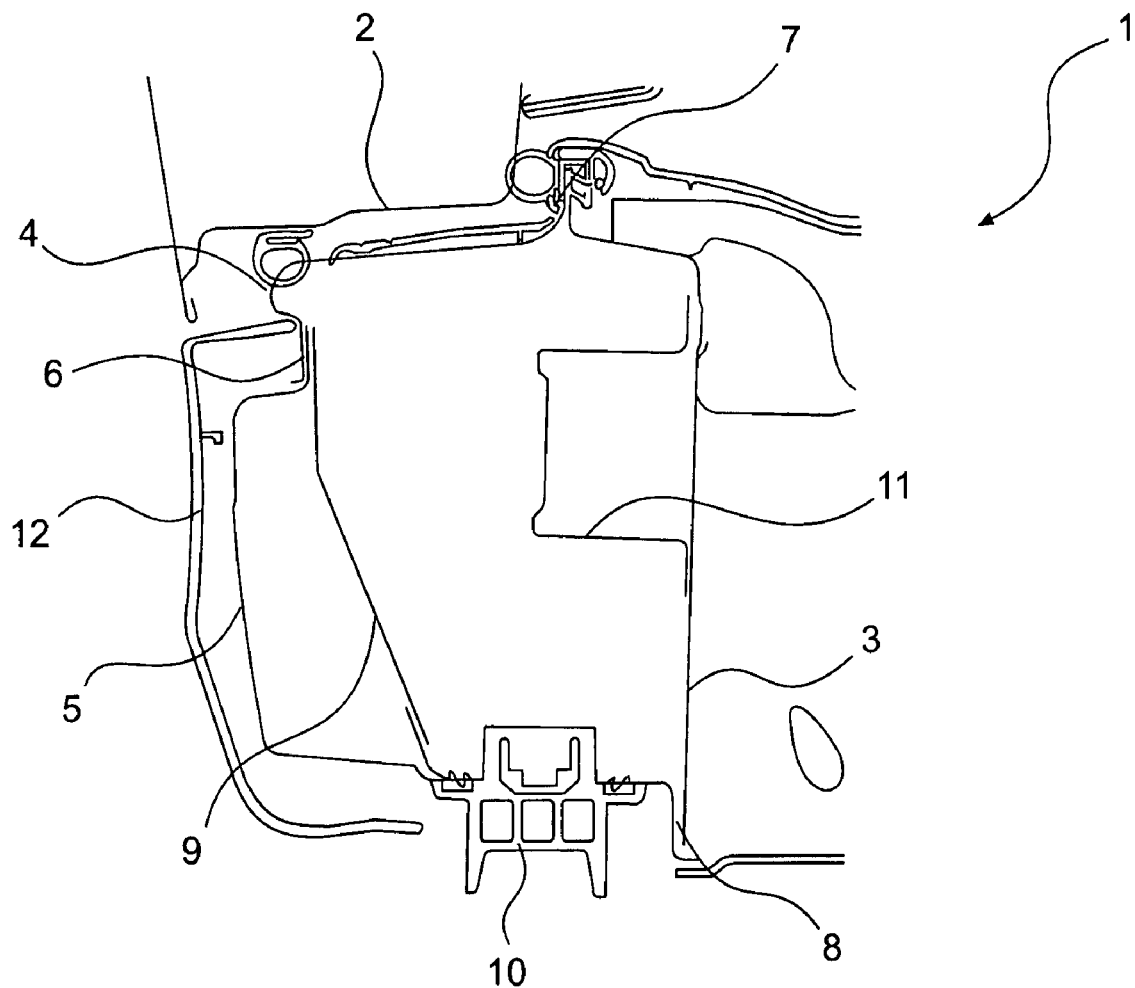
FIG. 1 shows a cross section of a side sill of a motor vehicle body, according to an exemplary embodiment of the invention.

FIG. 1 shows a cross section of an exemplary side sill 1 of a passenger vehicle in the region of a side door 2. The side sill 1 is composed of an inner shell 3 and an outer shell built according to shell construction. The outer shell may be formed by the lower region of a side wall 4 of the vehicle body and an outer panel 5. As illustrated in FIG. 2, the side wall 4 may extend in the longitudinal direction from an A-pillar 13 over the B- and C-pillars 14 and 15, and at the same time forms a rear fender 16 of the passenger vehicle. The side wall may extend vertically from the region of the side sill 1 to the roof side frame 17. As shown in FIG. 1, at the side sill 1 the side wall 4 and the outer panel 5 are connected to one another, for example, by a connecting flange 6 formed in the lower region of the side wall 4 via spot weld connections, thus forming the outer shell. The inner shell 3 and the outer shell 4, 5 are connected to one another, for example, by using an upper flange 7 and a lower flange 8. The side wall 4 may be connected to the inner shell 3 in the upper flange 7, whereas the outer panel 5 is connected to the inner shell 3 in the lower flange 8. On the underside of the side sill 1, in the respective front and rear regions, a recess is provided in the outer panel 5 in which a jack receptacle 10 may be formed.

To enable absorption of the forces transmitted via the jack receptacle 10 to the side sill 1 when the vehicle is jacked up, in the vicinity of the jack receptacle 10 the outer panel 5 may be reinforced with a two-piece reinforcement panel 9, which at one end is connected to the outer panel 5 and the inner shell 3 in the lower flange 8, and at the other end is connected to the outer panel 5 in the connecting flange 6. Between the jack receptacle 10 and the connecting flange 6 the reinforcement panel 9 is spaced at a distance from the outer panel 5. For purposes of weight reduction the reinforcement panel 9 also can have multiple recesses. For reinforcement, on the side of the inner shell 3 facing the outer shell 4, 5 an auxiliary panel 11 may be mounted which extends in the longitudinal direction of the side sill 1, and which, at its upper and lower edge regions is connected to the inner shell 3, and between these points is separated at a distance from the inner shell 3. The part of the side sill 1 visible from the vehicle exterior may be cladded with a trim panel 12 made of plastic.

In contrast to a known side wall, into which the outer shell of a side sill is completely integrated, a much smaller draw depth is necessary for the illustrated exemplary side wall 4. The required draw depth for the known side wall is determined chiefly by the width and shape of the side sill. As a result of the exemplary division of the outer shell according to the invention into the side wall 4 on the one hand and the outer shell 5 on the other hand, the required draw depth for the side wall 4 is significantly reduced. The width and shape of the side sill 1 affects almost exclusively the shape, thickness, and material quality of the outer panel 5. Due to the smaller draw depth for the side wall 4, the side wall may be manufactured from high-strength sheet steel having yield points of about 160 MPa or greater. As a result, the sheet thickness of the side wall 4 in turn may be reduced to about 0.7 mm, for example. Notwithstanding, this configuration does not result in manufacturing limitations for the design of the side sill 1. The material quality and sheet thickness of the outer panel 5 may be set independently of the side wall 4. The requirements for surface quality of the outer panel 5 are low, since the outer panel 5 is not visible, but instead is concealed on the vehicle by the panel 12. In addition, the same outer panel 5 may be used for various body variants, for a sedan and a station wagon-type vehicle, for example. Furthermore, the outer panel 5 may be combined with the reinforcement panel 9 as a prefabricated module, which likewise may be the same for multiple body variants.

The exemplary side sill 1 according to embodiments of the invention thus allows great freedom in the shaping of the side sill. The side wall 4 may be made of high-strength sheet steel, thus allowing the weight of the body of the passenger vehicle to be kept low. The rigidity requirements for the side sill 1 may be easily satisfied by a suitable selection of material for the outer panel 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a side sill of sheet metal shell construction, comprising:

at least one inner shell and one outer shell;

an upper and a lower flange connecting the at least one inner shell and one outer shell;

an outer panel attached at one end to a lower section of a side wall of the motor vehicle by a connecting flange to provide a downward extension and forming the one outer shell;

the lower flange for connecting the inner shell and another end of the outer panel; and the upper flange for connecting the inner shell and the side wall.

2. Motor vehicle according to claim 1, wherein the connecting flange comprises an overlap region of the side wall and the outer panel.

3. Motor vehicle according to claim 2, wherein the side wall and the outer panel are connected to one another via multiple spot welding connections.

4. Motor vehicle according to claim 1, further comprising a reinforcement panel extending in a longitudinal direction of the side sill, the reinforcement panel being attached between the at least one inner shell and one outer shell, one end being connected to the outer panel and the inner shell in the lower flange, and another end being connected to the outer panel and the side wall in the connecting flange, the reinforcement panel between the attachment regions being disposed at a distance from the outer panel.

5. Motor vehicle according to claim 1, further comprising a reinforcing auxiliary panel disposed on a side of the inner shell facing the outer shell, the auxiliary panel extending in a longitudinal direction of the side sill and connecting to the inner shell at its upper and lower edge regions, the auxiliary panel being disposed, between the connecting points, a distance from the inner shell.

6. Motor vehicle according to claim 1, further comprising a trim panel disposed on the side sill, the trim panel being externally visible.

7. Motor vehicle according to claim 1, wherein the side wall is formed of high-strength sheet steel.

8. A vehicle body side sill, comprising:

an inner shell of the side sill;

a side wall of the vehicle forming a portion of an outer shell of the side sill;

an outer panel connectable to a lower section of the side wall by a connecting flange for forming another portion of the outer shell;

an upper flange for connecting the inner shell to the side wall; and a lower flange for connecting the inner shell to the outer panel.

9. The side sill according to claim 8, further comprising an auxiliary panel for reinforcing the inner shell, disposed on a face of the inner shell facing the outer shell.

10. The side sill according to claim 9, wherein the auxiliary panel extends substantially longitudinally.

11. The side sill according to claim 8, further comprising a reinforcement panel disposed on a face of the outer shell facing the inner shell.

12. The side sill according to claim 8, wherein the side sill is formed of high-strength sheet steel.

13. A method of assembling a side sill of a vehicle, comprising the acts of:
   providing a lower section of a side wall of the vehicle;
   attaching an outer panel of the side sill to the lower section via a connecting flange, to form an outer shell of the side sill; and
   attaching an inner shell of the side sill to the outer shell, an upper flange connecting the inner shell to the side wall and a lower flange connecting the inner shell to the outer panel.

14. The method according to claim 13, further comprising forming the side wall of high-strength sheet steel.

15. The method according to claim 13, further comprising mounting a reinforcement panel on the outer shell, one end of the reinforcement panel being attached in proximity of a jack receptacle.

16. The method according to claim 13, further comprising mounting an auxiliary panel on a surface of the inner shell facing the outer shell.

17. The method according to claim 13, further comprising mounting a trim panel on an outer surface of the outer shell, to conceal the outer panel.

18. The method according to claim 13, further comprising forming the side wall to merge without gradation into the side sill, to minimize strain of a high-strength sheet steel forming the side wall.

* * * * *